United States Patent [19]

Kobayashi et al.

[11] Patent Number: 5,734,532
[45] Date of Patent: *Mar. 31, 1998

[54] MAGNETO-RESISTIVE EFFECT TYPE MAGNETIC HEAD DEVICE

[75] Inventors: Tomio Kobayashi, Kanagawa; Hideo Suyama, Miyagi, both of Japan

[73] Assignee: Sony Corporation, Tokyo, Japan

[*] Notice: The term of this patent shall not extend beyond the expiration date of Pat. No. 5,648,886.

[21] Appl. No.: 828,561

[22] Filed: Mar. 31, 1997

Related U.S. Application Data

[63] Continuation of Ser. No. 530,992, Sep. 20, 1995, Pat. No. 5,648,886.

[30] Foreign Application Priority Data

Sep. 22, 1994 [JP] Japan .................... 6-254590

[51] Int. Cl.⁶ .................................................. G11B 5/39
[52] U.S. Cl. ............................................ 360/113; 360/108
[58] Field of Search .............................. 360/107, 108, 360/113; 324/252; 338/32 R

[56] References Cited

U.S. PATENT DOCUMENTS

| | | | |
|---|---|---|---|
| 4,000,512 | 12/1976 | Lau | 360/45 |
| 5,011,818 | 4/1991 | Katoka et al. | 324/248 |
| 5,515,220 | 5/1996 | Alioth | 360/108 |
| 5,648,886 | 7/1997 | Kobayashi et al. | 360/113 |

Primary Examiner—Stuart S. Levy
Assistant Examiner—William J. Klimowicz
Attorney, Agent, or Firm—Hill, Steadman & Simpson

[57] ABSTRACT

A magneto-resistance effect type magnetic head having high output can be obtained as a reproduction head for a rotating drum type VTR by only providing a conventional rotary transformer with a rotor and a stator for supplying a bias current without a need for a special mechanism for transmitting a direct current. There is provided a magneto-resistance effect type magnetic head device to be mounted on a rotating drum having a bias conductor and a sense conductor, including a rotary transformer connected to the bias and sense conductors wherein an alternating current having a frequency lower than the frequency of a recording signal is applied to at least one of stator channels facing rotor channels of the rotary transformer. A current is applied to at least either the bias conductor or sense conductor at the stator side of the rotary transformer to produce a non-direct current at a terminal on the rotor side of the rotary transformer connected to the magneto-resistance effect type magnetic head only in a time zone when the magneto-resistance effect type magnetic head is not required to reproduce the recording signal and to produce a direct current at a terminal on the rotor side in a time zone when the recording signal must be reproduced.

1 Claim, 14 Drawing Sheets

FIG. 10A CURRENT
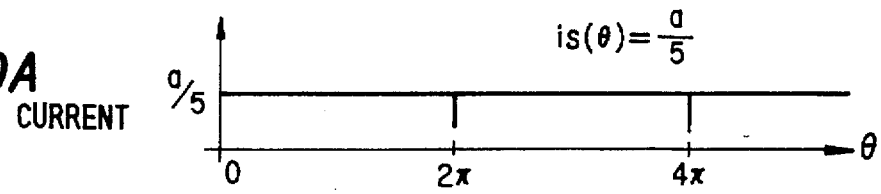
FIG. 10B RECORDING CURRENT
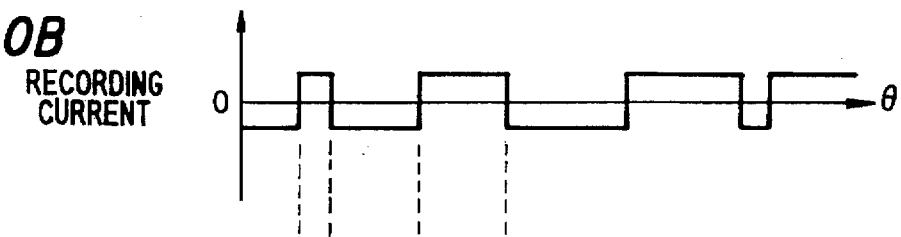
FIG. 10C
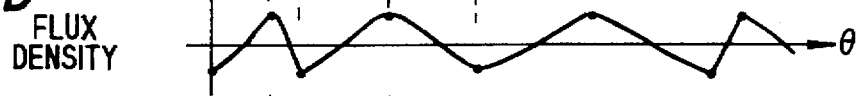
FIG. 10D FLUX DENSITY
FIG. 10E VOLTAGE
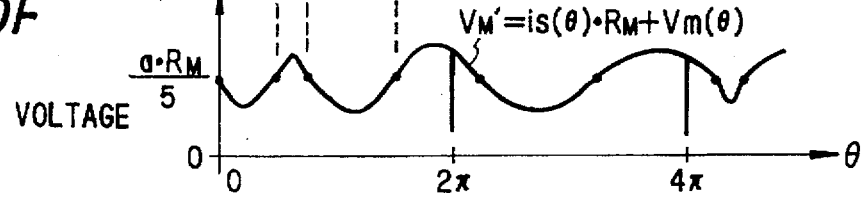
FIG. 10F VOLTAGE
FIG. 10G CURRENT
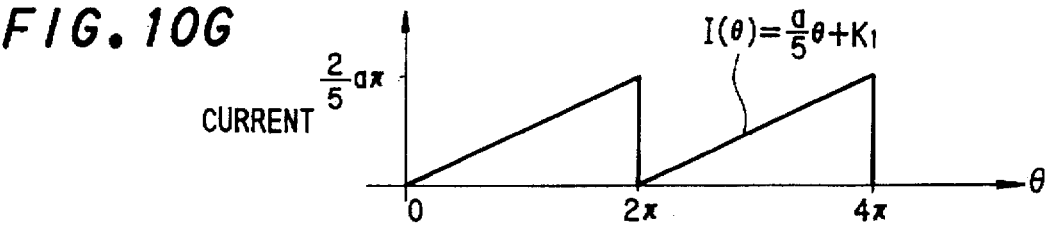

MAGNETO-RESISTIVE EFFECT TYPE MAGNETIC HEAD DEVICE

This is a continuation of application Ser. No. 08/530,992 filed Sep. 20, 1995 now U.S. Pat. No. 5,648,886.

BACKGROUND OF THE INVENTION

1. Field of the Invention

The present invention relates to magneto-resistance effect type magnetic head devices and, more particularly, to a magneto-resistance effect type magnetic head device suitable for a rotating drum.

2. Description of the Related Art

A magneto-resistance effect type magnetic head (hereinafter referred to as "MR head") is configured using a magnetic layer having a magneto-resistance effect (hereinafter referred to as "MR film") and has a thin film type structure which allows the device to be more suitable for mass production and to be more compact as a whole. In addition, it can directly respond to a signal magnetic field independently of its speed relative to a magnetic recording medium to provide high reproduction output, which is advantageous in that high reproduction output can be obtained and in that multi-track configuration can be easily implemented. Therefore, this type of device has increasing demand in the application thereof to reproduction heads for fixed head type magnetic recording apparatuses.

A description will now be made with reference to FIGS. 11(A), 11(B), 12, 13, and 14 on examples of configurations of a yoke type single-channel MR head and a yoke type multi-channel MR head (hereinafter single-channel MR heads and multi-channel MR heads are collectively referred to as MR heads).

FIGS. 11(A) and 11(B) show a single-channel MR head 13. FIG. 12 is a sectional view of a major part of a multi-channel MR head 14. FIG. 13 is a partial exploded view of the multi-channel MR head 14 in FIG. 12. FIG. 14 is an overall exploded view of the multi-channel MR head 14 in FIG. 12. In FIGS. 11(A), 11(B), 12, 13, and 14, the multi-channel MR head 14 can be regarded as an MR head configured by integrating a plurality of single-channel MR heads 13 on the same substrate. Therefore, those MR heads will be described with parts serving like functions indicated by like reference numerals.

In FIGS. 11(A), 11(B), 12, 13, and 14, reference numeral 1 designates a non-magnetic substrate, and the non-magnetic substrate 1 is coated with a magnetic film layer made of a Fe—Si—Al type alloy which forms a lower yoke 2. The lower yoke 2 is coated with a silicon oxide film which constitutes a gap spacer layer 4 for forming a gap 3. Reference numeral 5 designates a bias conductor which is formed by a band-shaped copper material and is common to all channels. The bias conductor 5 is insulated by an insulation film 6 surrounding it which is constituted by a silicon oxide film. It serves as a path of a bias current for applying a bias magnetic field to an MR film 7 from a power supply connected between bias conductor terminals 5c and 5d.

The MR film 7 is coated with a pair of upper yokes 8a and 8b made of a permalloy on both sides thereof, the upper yoke 8b being connected to the lower yoke 2.

One end of each of the upper yokes 8a and 8b rides on the bias conductor 5 and MR film 7 and constitutes a magnetic circuit as a core extending across those yokes.

A sense conductor 20 to be used as a signal line is provided on the MR film 7 and upper yokes 8a and 8b with an insulation film 9 constituted by a silicon oxide film or the like interposed therebetween, one end of the conductor 20 being connected to the upper yoke 8a. A non-magnetic film 11 made of $Ai_2O_2$ is provided on the sense conductor 10, and a non-magnetic protection plate 12 is provided on the non-magnetic film 11.

A surface 15 on which a magnetic recording medium is slid is formed so that the gap 3 faces a magnetic recording medium, e.g., a magnetic tape, by grinding the front faces of the non-magnetic substrate 1, lower yoke 2, gap spacer layer 4, upper yoke 8a, non-magnetic film 11, and non-magnetic protection plate 12.

A magnetic circuit is constituted by a loop formed by the lower yoke 2, magnetic gap 3, upper yokes 8a and 8b, MT film 7, and lower yoke 2.

Thus, a single-channel MR head 13 or multi-channel MR head 14 is provided.

In the single-channel MR head 13 or multi-channel MR head 14, when signal magnetic flux from the gap 3 which contacts a magnetic recording medium flows through the above-described magnetic circuit, the resistance of the MR film 7 in this magnetic circuit changes with an external magnetic field produced by this signal flux. Conventionally, a sense direct current to detect the change in the resistance of the MR film 7 flows through the sense conductor 10, and a direct current flows through the bias conductor 5 as a bias current to generate a predetermined bias magnetic field. With this bias current, the MR film 7 linearly operates to exhibit change in resistance which depends on the signal magnetic flux, the change in resistance being output as change in the voltage across the MR film 7.

It has been desired to use MR heads as described above which are advantageous in that they provide high reproduction output in rotating drum type magnetic recording apparatuses. However, in rotating drum type magnetic recording apparatuses which mostly employ signal transmission through a rotary transformer, it has been inevitable to employ a signal transmission system utilizing a rotating element such as a slip ring and bushes suitable for the transmission of a direct current for FIR heads as described above which involves the transmission of a direct current to supply the bias current and sense current. This has resulted in a cost increase and has made it difficult to make such apparatuses more compact.

There is a possible method wherein an integrated circuit for converting an alternating current obtained from a rotary transformer into a stable direct current is incorporated in the rotary drum to supply the bias current. However, this method is too expensive to put it in practical use.

Since an MR head can provide high output even at a low medium speed, the application of an MR head to a rotary drum type recording apparatus provides an advantage in that the speed of the apparatus can be low relative to the tape. In this regard, in conventional rotating drum type magnetic recording apparatuses, the transfer speed of the recording signal must be increased in order to obtain higher image quality. Most digital video tape recorders employ transfer speed on the order of 10 to several tens Mbps.

In addition, it is desired that the difference in speed between the tape and head is reduced to reduce wear that occurs therebetween; the sound produced during the rotation of the drum is reduced; and the mechanical precision of the drum which has been required for high speed rotation is relaxed to achieve a cost reduction with the tracking accuracy between the tape and head maintained. Such demands are incompatible with the need for increasing the transfer speed as described above.

It is an object of the present invention to provide an MR head which provides the advantages of an MR head as described above, in which a rotary transformer can be used with facility, and which provides high reproduction output. In addition, it is an object of the invention to provide a multi-channel MR head which has been more difficult to provide as the track density increases in the case of an inductive type head.

SUMMARY OF THE INVENTION

According to the present invention, there is provided a magneto-resistance effect type magnetic head device to be loaded on a rotating drum having a bias conductor and a sense conductor, including a rotary transformer connected to the bias and sense conductors wherein an alternating current having a frequency lower than the frequency of a recording signal is applied to at least one of stator channels facing rotor channels of the rotary transformer.

A current is applied to at least either the bias conductor or sense conductor at the stator side of the rotary transformer to produce a non-direct current at a terminal on the rotor side of the rotary transformer connected to the magneto-resistance effect type magnetic head only in a time zone when the magneto-resistance effect type magnetic head is not required to reproduce the recording signal and to produce a direct current at a terminal on the rotor side in a time zone when the recording signal must be reproduced.

For example, the bias conductor may be constituted by two independent bias conductors and a current may be applied from the stator side of the rotary transformer such that the sum of the alternating currents flowing through the two bias conductors approximates a direct current.

Another configuration may be employed in a magneto-resistance effect type magnetic head device to be loaded on a rotating drum having only a sense conductor, wherein a rotary transformer connected to the sense conductor is provided and an alternating current having a frequency lower than the frequency of a recording signal is applied to at least one of stator channels facing rotor channels of the rotary transformer.

BRIEF DESCRIPTION OF THE DRAWING

FIGS. 10(A) through 10(G) are operational waveform diagrams of another embodiment of the present invention.

FIG. 12 is an exploded view of a typical yoke type single-channel MR head.

DETAILED DESCRIPTION OF THE PREFERRED EMBODIMENTS

Figure 1A:
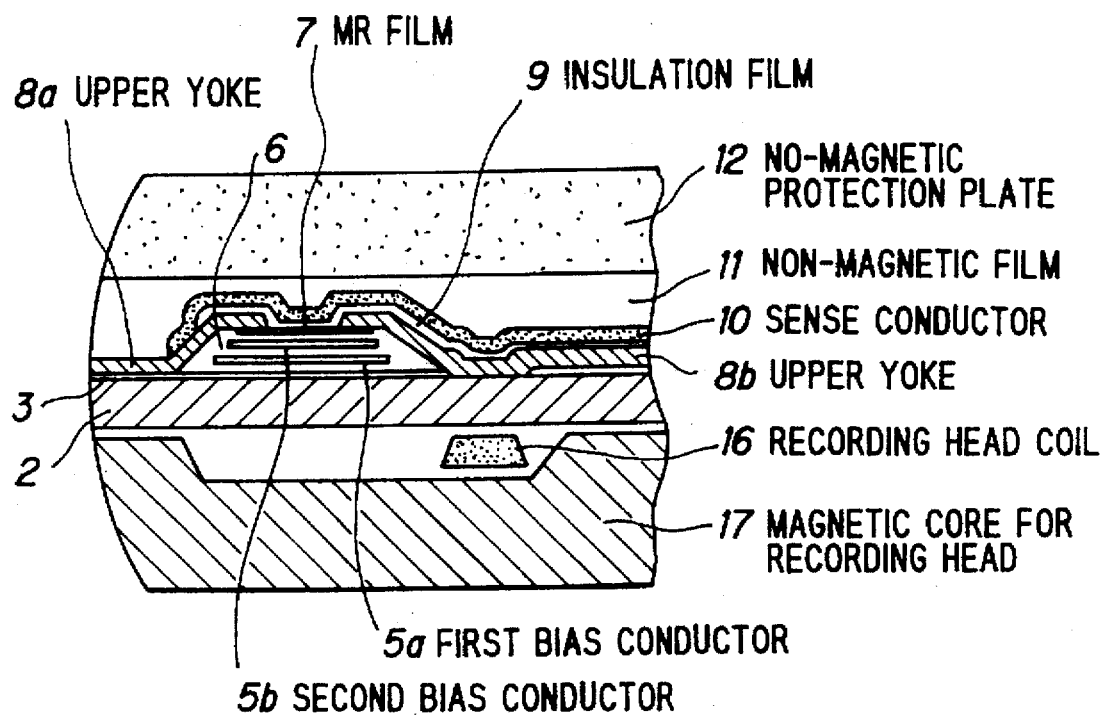
FIG. 1(A) is a sectional view of a major part of a yoke type MR head according to a first embodiment of the present invention.
Figure 1B:
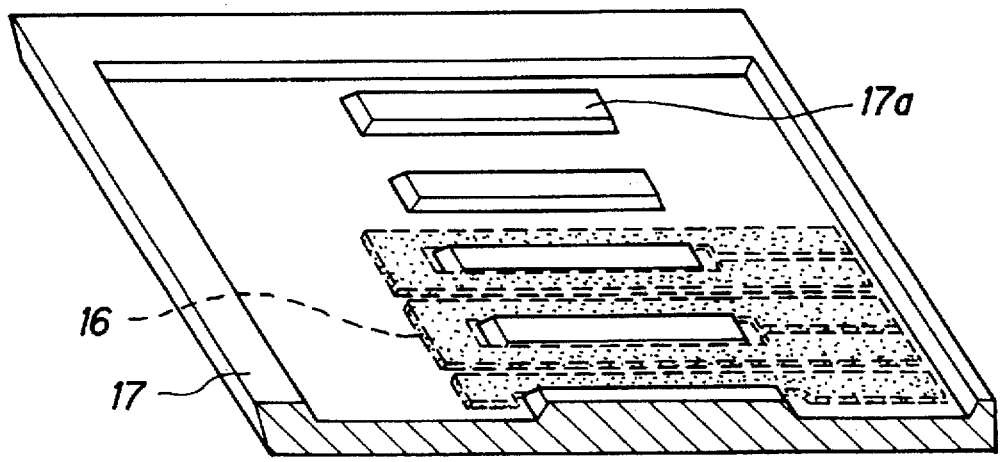
FIG. 1(B) is a perspective view of a major part of the yoke type MR head according to the first embodiment of the present invention.
Figure 2A:
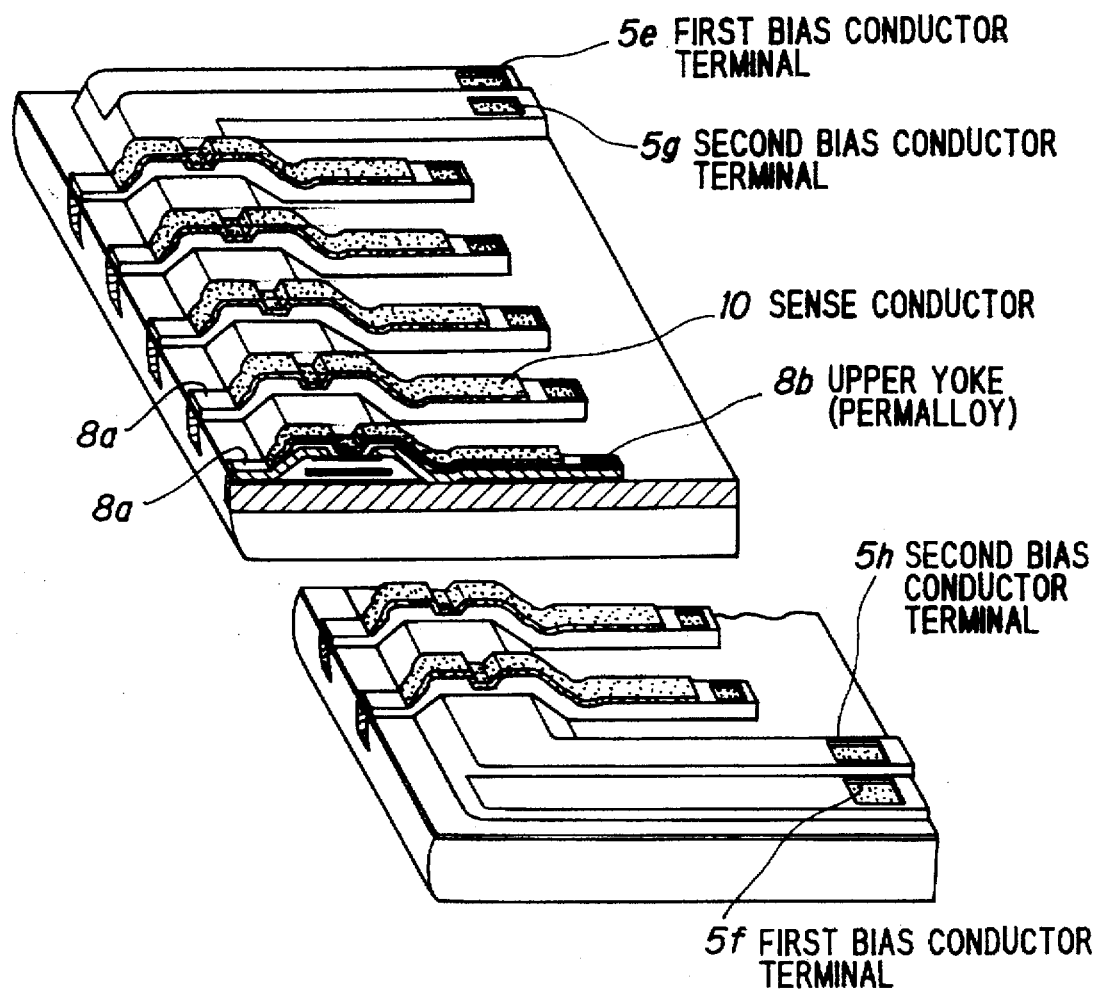
FIG. 2(A) is a perspective view of a major part of the yoke type multi-channel MR head according to the first embodiment of the present invention.
Figure 2B:
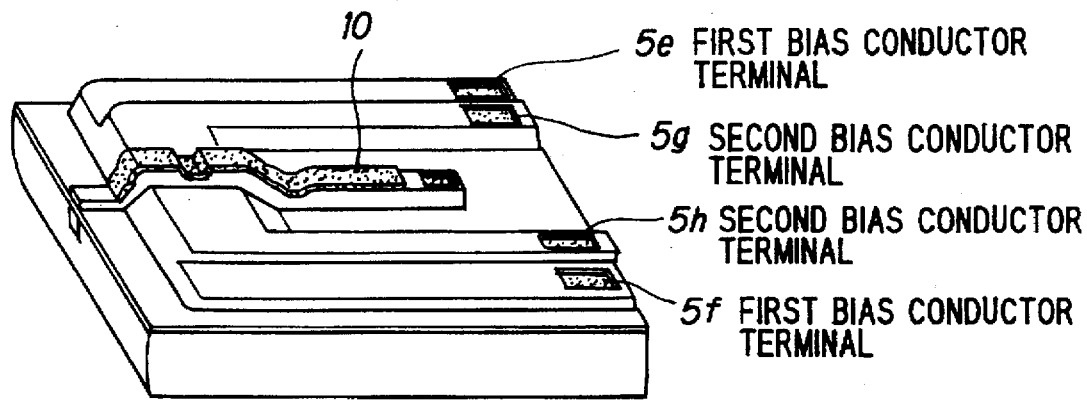
FIG. 2(B) is a perspective view of a major part of a single-channel MT head.

FIG. 1(A) and FIG. 1(B) are a sectional view and a partially exploded perspective view, respectively, of an MR head according to a first embodiment of the present invention. FIG. 2(A) and FIG. 2(B) are exploded perspective views of major parts of a multi-channel MR head and a single-channel MT head, respectively.

In FIGS. 1(A), 1(B), 2(A), and 2(B), parts identical to those in FIGS. 11(A), 11(B), 12, 13, and 14 are indicated by like reference numerals.

The present invention is characterized in that a bias conductor provided under an MR film 7 consists of two independent bias conductors, i.e., a first bias conductor 5a and a second bias conductor 5b. These bias conductors are surrounded by an insulation film 6 to be insulated from each other. Further, the two ends of the first bias conductor 5a and second bias conductor 5b face first bias conductor terminals 5e and 5f and second bias conductor terminals 5g and 5h, respectively.

In the present embodiment, in order to configure an MR inductive composite magnetic head, a substrate structure is employed wherein a recording head coil 16 is wound around a flat projection 17a formed on a recording head magnetic core 17.

Further, the present invention is characterized in that an AC bias current is applied to each of the first bias conductor 5a and the second bias conductor 5b, the AC bias current being phase-shifted from each other so that the sum of them substantially appears as a direct current on a time base.

The AC currents applied to the first bias conductor 5a and second bias conductor 5b will now be described in detail.

In FIGS. 1(A), 1(B), 2(A), and 2(b), f(θ) designates the current applied to the first bias conductor 5a and g(θ) designates the current applied to the second bias conductor 5b. Those currents are chosen so that $f(\theta)+g(\theta)=a\pi$ (a constant) is satisfied where $(\theta)=2\pi ft$ (f designates the frequency of the bias current, t designates time). A frequency lower than the frequency of the recording signal is selected as the bias current f.

For example, assume that $f(\theta)=a/\pi+a\sin\theta$ and $g(\theta)=a\sin\theta(\theta+\pi)$. Then, $f(\theta)+g(\theta)=a/\pi$, which means that the sum of the currents applied to the first bias conductor 5a and the second bias conductor 5b is equivalent to a direct current.

The supply currents to the stator side of the rotary transformer required for applying such bias currents f(θ) and g(θ) to the two bias conductors 5a and 5b of the MR head from the stator side of the rotary transformer through the rotor are expressed as integrated forms of fθ and gθ as follows.

$$\int f(\theta)d(\theta)=F(\theta)=(a/\pi)\theta/\pi-a\cos\theta+c$$

$$\int f(\theta)d(\theta)=G(\theta)=a\cos\theta+c$$

Figure 8A:
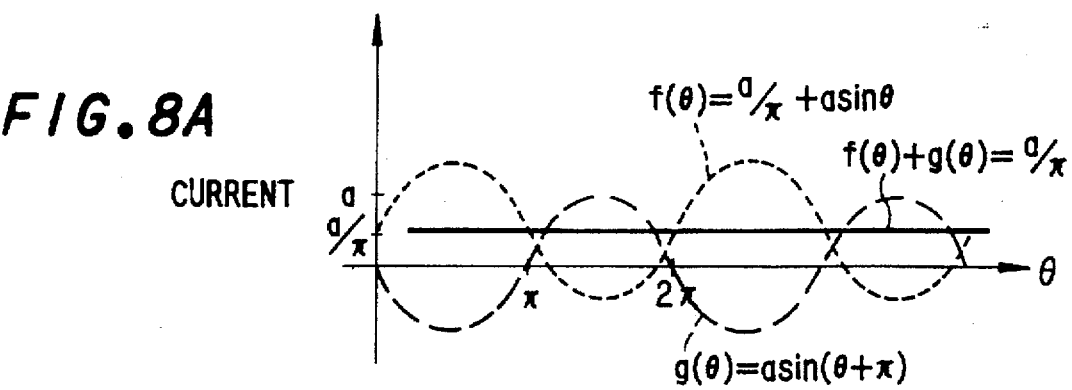
FIGS. 8(A) through 8(C) are waveform diagrams of a bias current according to the first embodiment of the present invention.
Figure 8B:
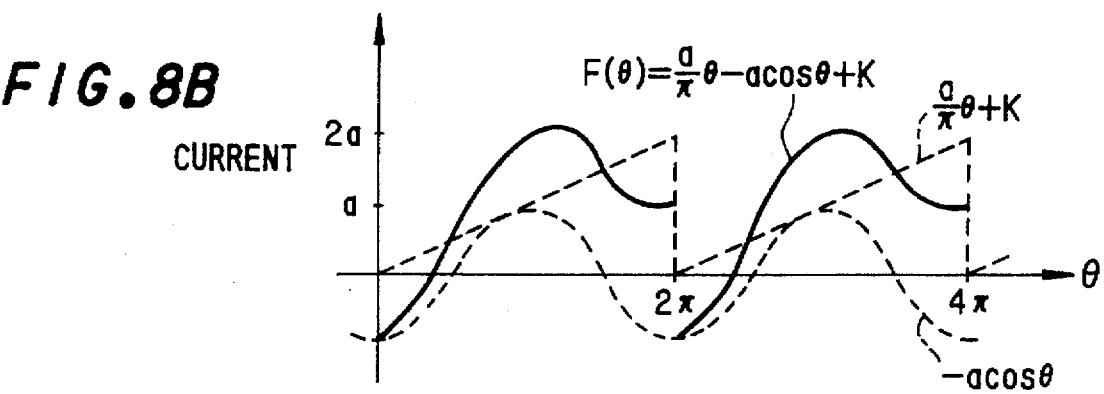
Figure 8C:
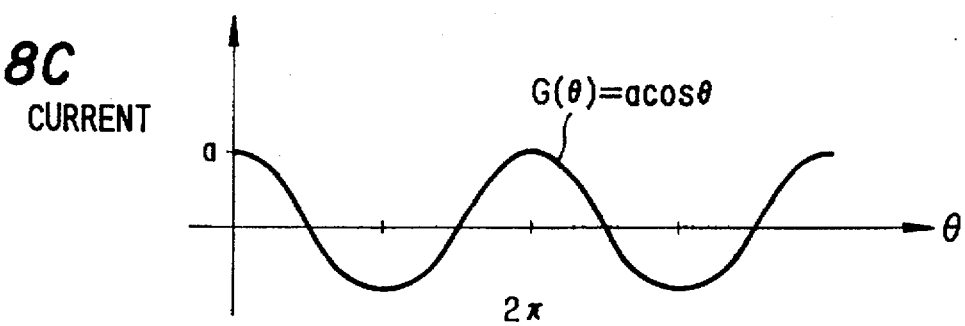

FIG. 8(A) shows waveforms of $f(\theta)$, $g(\theta)$, and $f(\theta)+g\theta$. FIG. 8(B) shows a waveform of the integrated form $F(\theta)$ of $f(\theta)$. FIG. 8(C) shows a waveform of the integrated $G(\theta)$ of $g(\theta)$.

A current expressed by $F(\theta)=(a/\pi)\theta-a\cos\theta+K(c=K)$ is supplied to the stator side of the rotary transformer which supplies the current $f(\theta)$ applied to the first bias conductor $5a$. K is a constant $-2an$ (n is an integer) when $\theta$ is in the range from $2n\pi$ to $2(n+1)$ and is the sum of a triangular waveform $(a/\pi)\theta+K$ and a cosine waveform $(-a\cos\theta)$ on a time bases as shown in FIG. 7(B).

In FIG. 8(B), the point at which the triangular waveform $(a/\pi)\theta+K$ undergoes an abrupt change, i.e., the instance at which the angle $\theta$ such as $2\pi$ and $4\pi$ is formed, is set at a point in time at which no problem occurs even if an MR head does not generate any signal on the rotating drum of a VTR because the waveform can easily loose sharpness in an actual circuit. Specifically, in practice, a flat direct current can be applied as the sum of the currents flowing through the two bias conductors by setting such a point so that it corresponds to time other than the time for the tape contact angle of the rotating drum.

Next, the current $G(\theta)=a\cos\theta$ as shown in FIG. 8(C) is applied to the stator side of the rotary transformer connected to the second bias conductor $5b$.

The waveforms shown herein are illustrative, and the currents are essentially chosen so that the sum of the current flowing through the first bias conductor $5a$ and second bias conductor $5b$ becomes a direct current.

As to the sense current, a very weak current passes the sense conductor 10, upper yoke $8a$, MR film 7, and upper yoke $8b$ in the order listed in the yoke type MR head shown in FIG. 1(A), and change in the resistance of the MT film 7 having a thickness of several hundred angstrom is output as reproduction from the MR head.

A description will now be made with reference to the waveform diagrams shown in FIGS. 9(A) through 9(F) on a case wherein the sense current is supplied as an alternating current which is stable enough not to be affected by load fluctuation.

For example, if a current $i_S(\theta)$ which is about one-fifth the current $f(\theta)$ flowing through the first bias conductor $5a$ is applied to the MR film 7 as the sense current, it is expressed as follows.

$$i_S(\theta)=(a/5\pi)+(a/5)\sin\theta \text{ (See FIG. 8(A))}$$

The voltage across the terminals of the MR film 7 in this case is expressed by the following equation.

$$V_M=i_S(\theta)\cdot R_M \qquad \text{Equation 1}$$

where $R_M$ represents the resistance of the MR film 7 when it senses no magnetization.

Figure 9A:
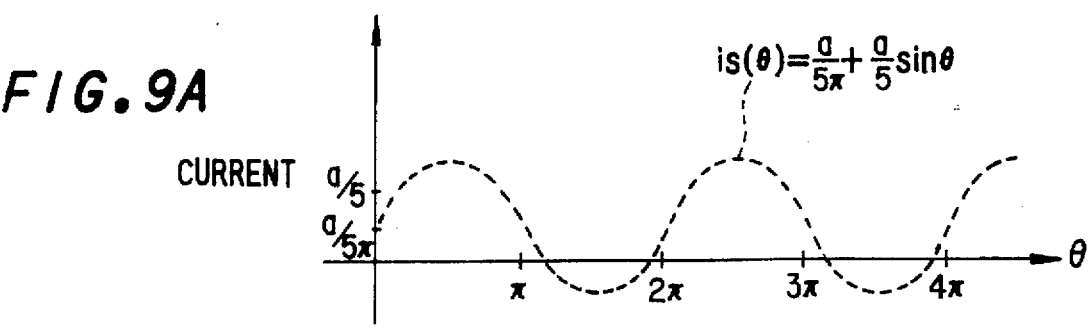
FIGS. 9(A) through 9(F) are operational waveform diagrams of the first embodiment of the present invention.
Figure 9B:
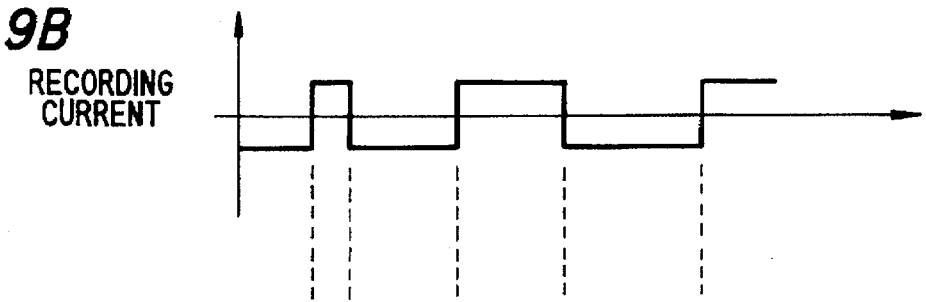
Figure 9C:
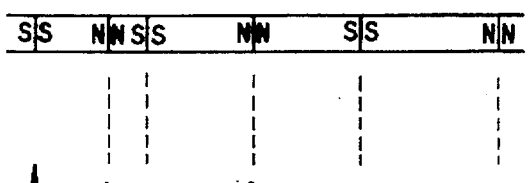

If the current for the recording on the magnetic tape has a waveform as shown in FIG. 9(B), the magnetization on the tape has the pattern as shown in FIG. 9(C) when it is plotted in correspondence to the position of the current waveform in FIG. 9(A) along the $\theta$-axis. The pattern is converted into position on a time base based on the relationship $\theta=2\pi ft$, and the correspondence to the position on the tape is given by $x=vt$ where v represents the relative speed between the tape and head. f represents the frequency of the sense current which is chosen to a value lower than the frequency of the recording signal.

Figure 9D:
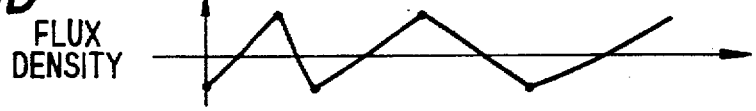
Figure 9E:
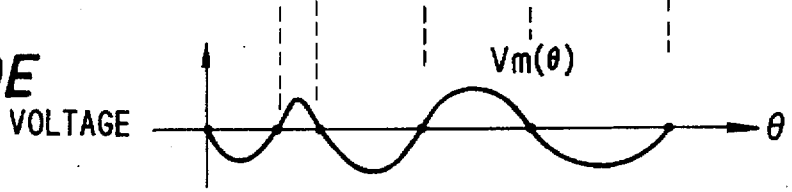
Figure 9F:
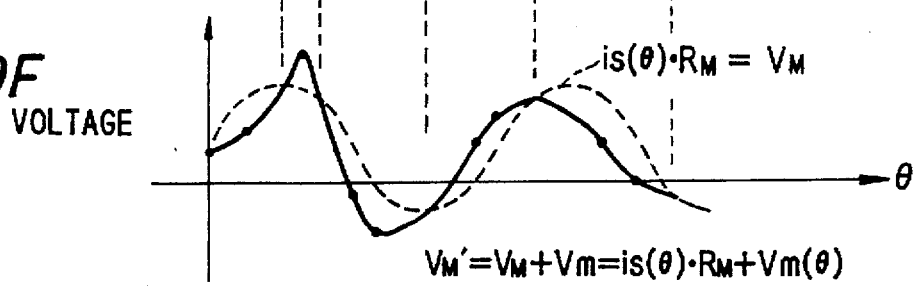
Figure 11A:
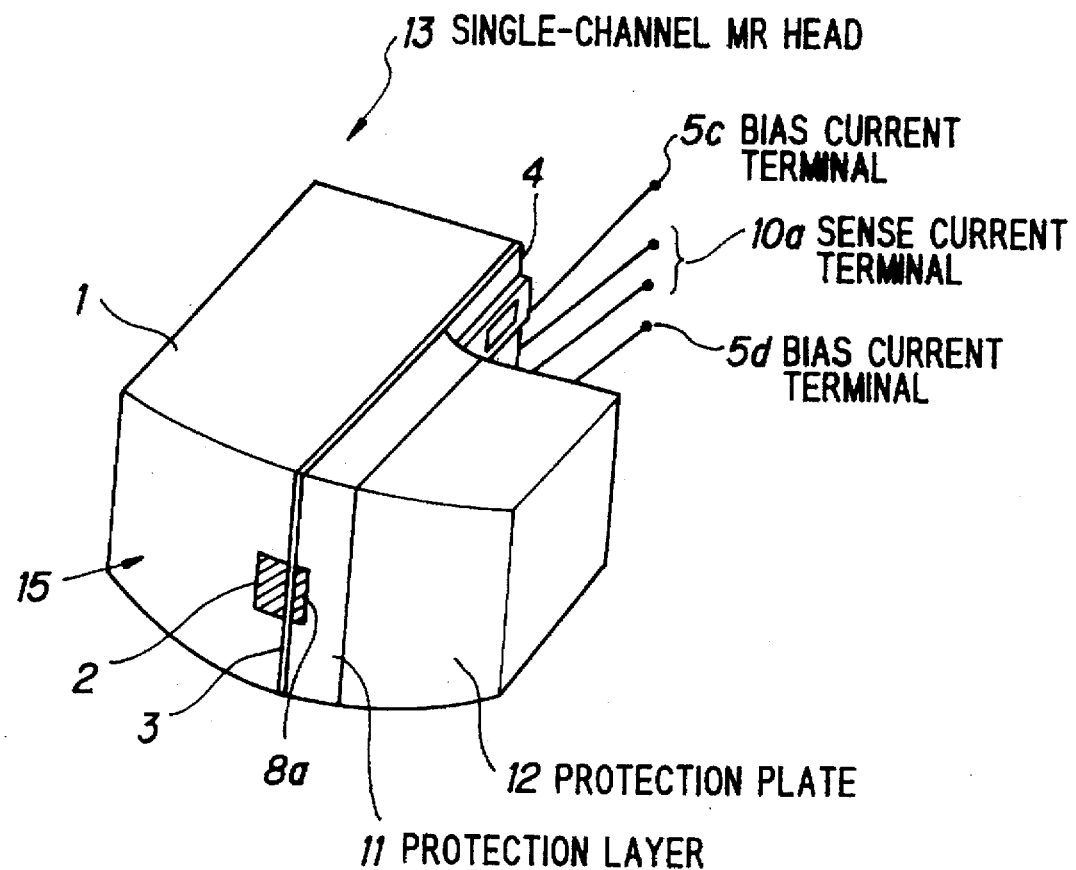
FIGS. 11(A) and 11(B) illustrate a typical yoke type single-channel MR head.
Figure 11B:
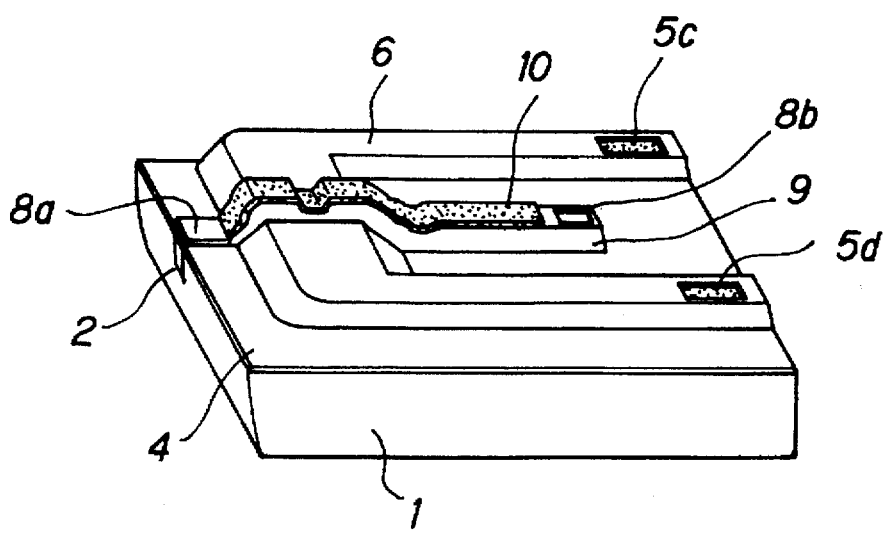
Figure 12:
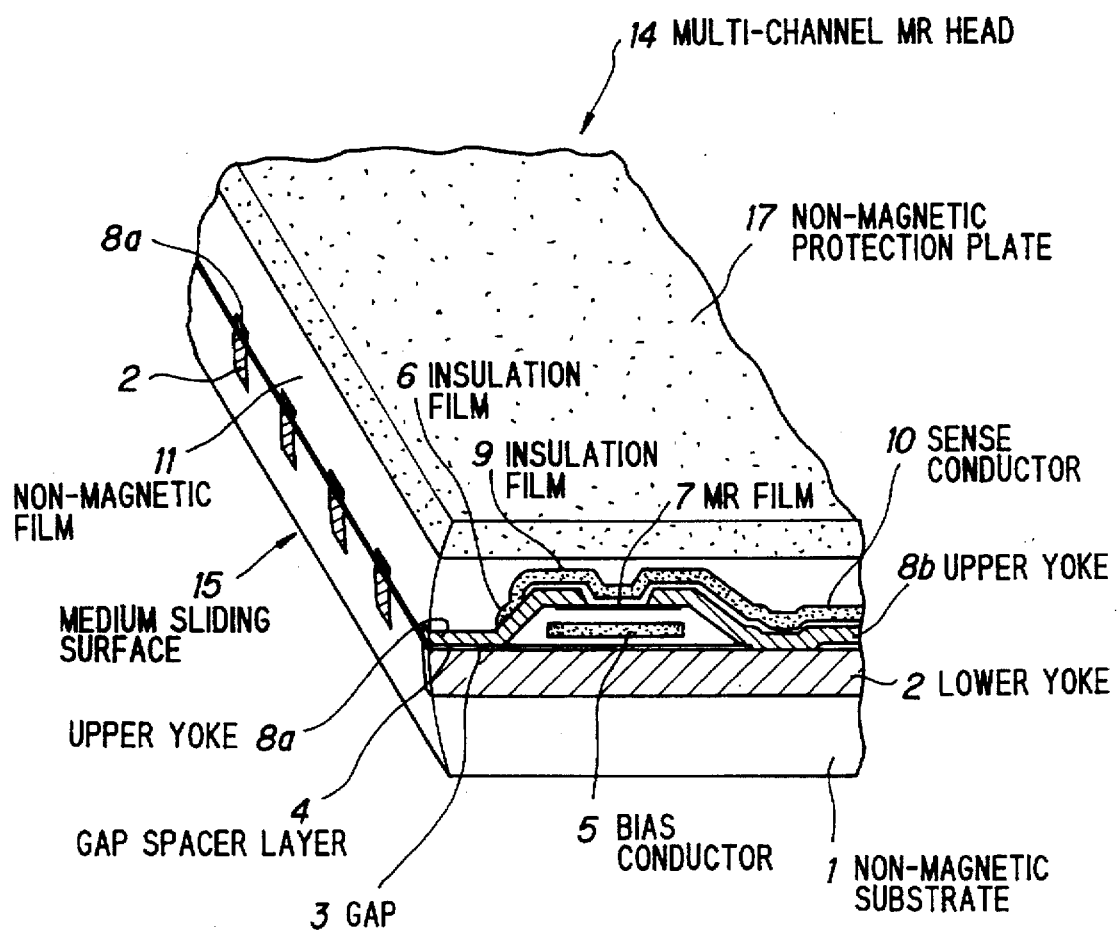
FIG. 12 is a sectional view of a major part of a typical yoke type single-channel MR head.
Figure 13:
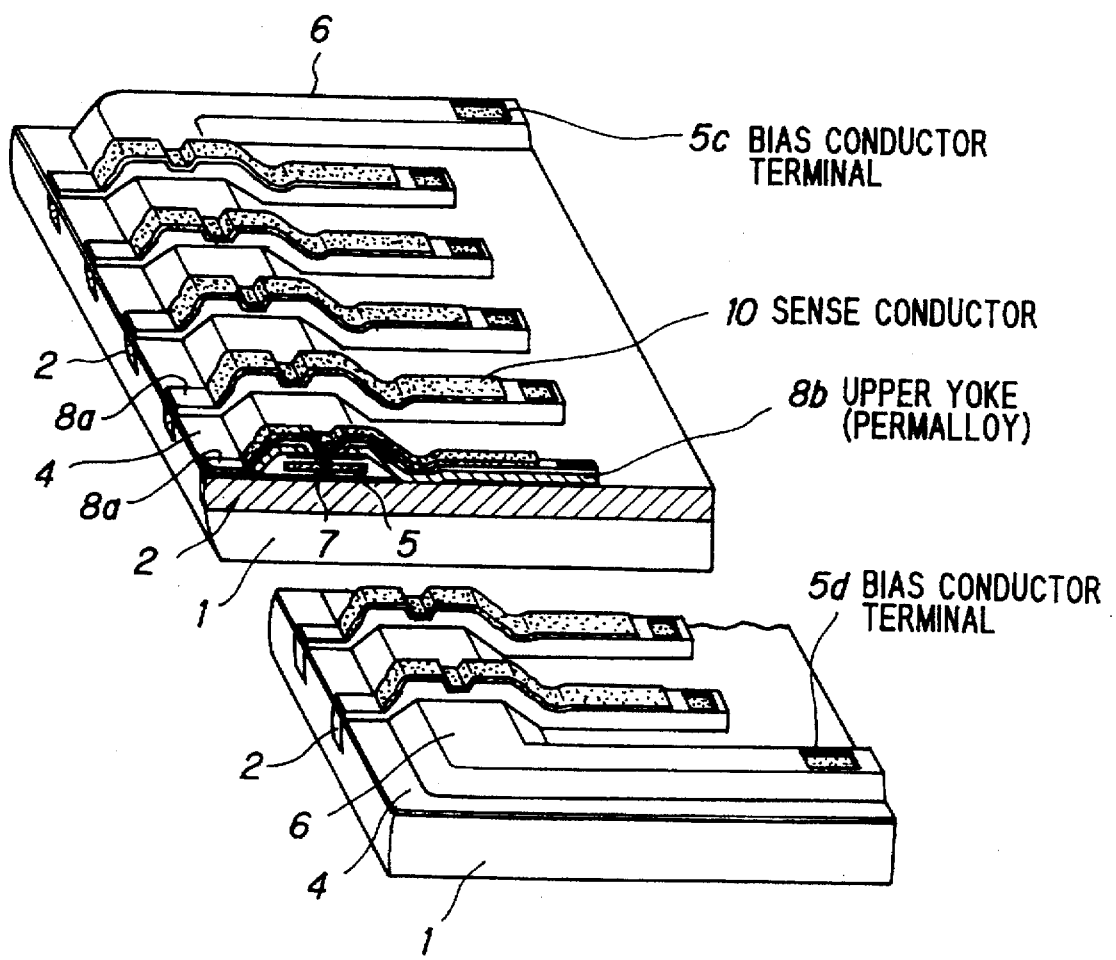
FIG. 13 is a perspective view of a major part of a typical yoke type single-channel MR head.
Figure 14:
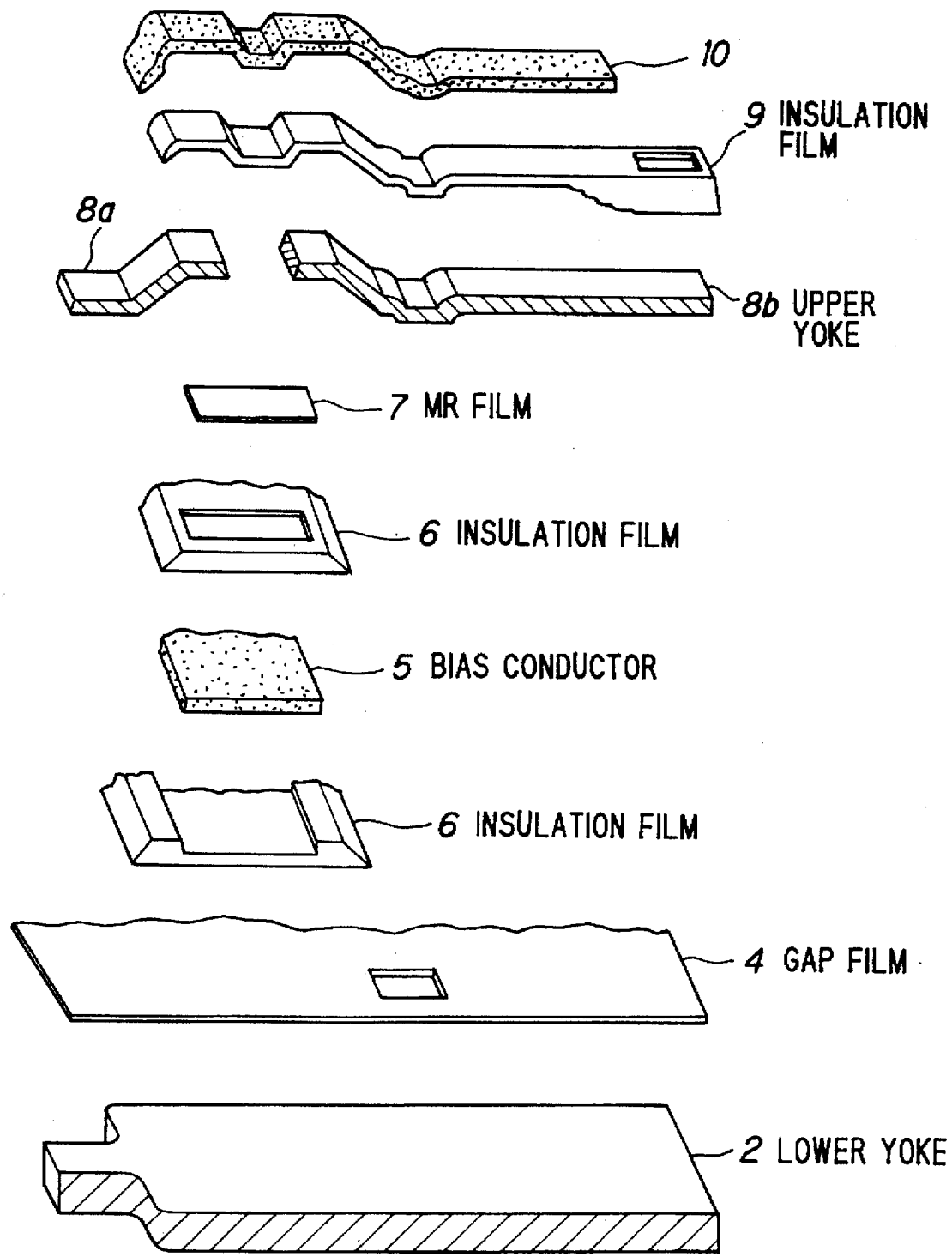

Further, the flux density on the tape and the voltage induced across the terminals of the MR head are shown in FIGS. 9(D) and 9(E), respectively. Therefore, the voltage generated across the terminals of the MR film 7 during the reproduction of the signal from the recording medium is given by the following equation as illustrated in FIG. 9(F).

$$V_M'=V_M+V_m=i_S(\theta)\cdot R_M+V_m(\theta) \qquad \text{Equation 2}$$

Figure 7:
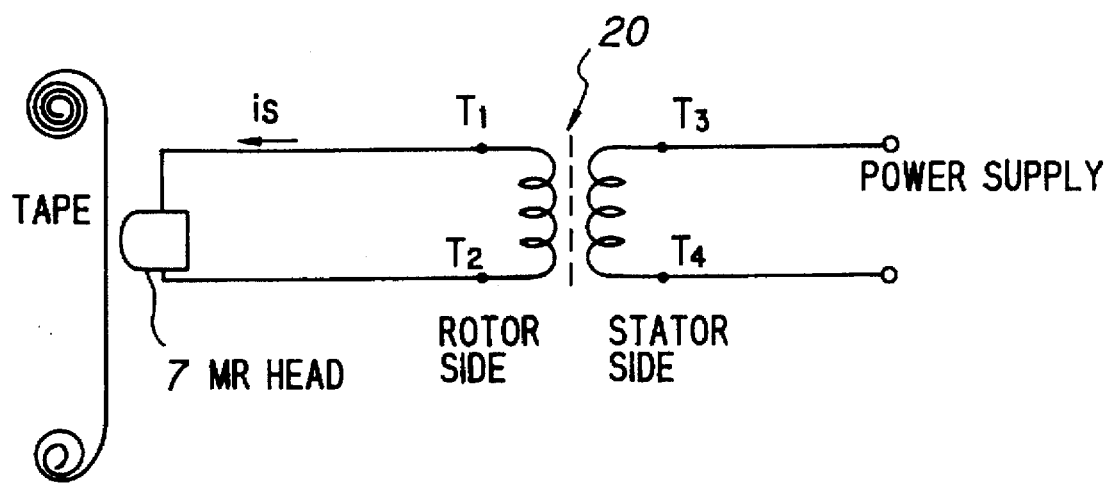
FIG. 7 illustrates the input and output of a rotary transformer.

As shown in FIG. 7, the terminals of the MR head 7 are connected to rotor side terminals T1 and T2 of a rotary transformer 20, and fluctuation in magnetization on the tape is detected from the difference between the voltage across stator side terminals T3 and T4 and the voltage at the terminal of the power supply that supplies the sense current. Specifically, the difference between the values given by Equations 1 and 2 is detected at the stator side to output the change in the voltage across the MR head 7 caused by the change in the resistance thereof in response to the signal flux through the rotary transformer 20. Although the illustrated connection of the rotary transformer 20 is for a single-channel, the output signal is obtained basically in the same manner for both the single-channel and multi-channel configurations.

Figures 5A, 5B:
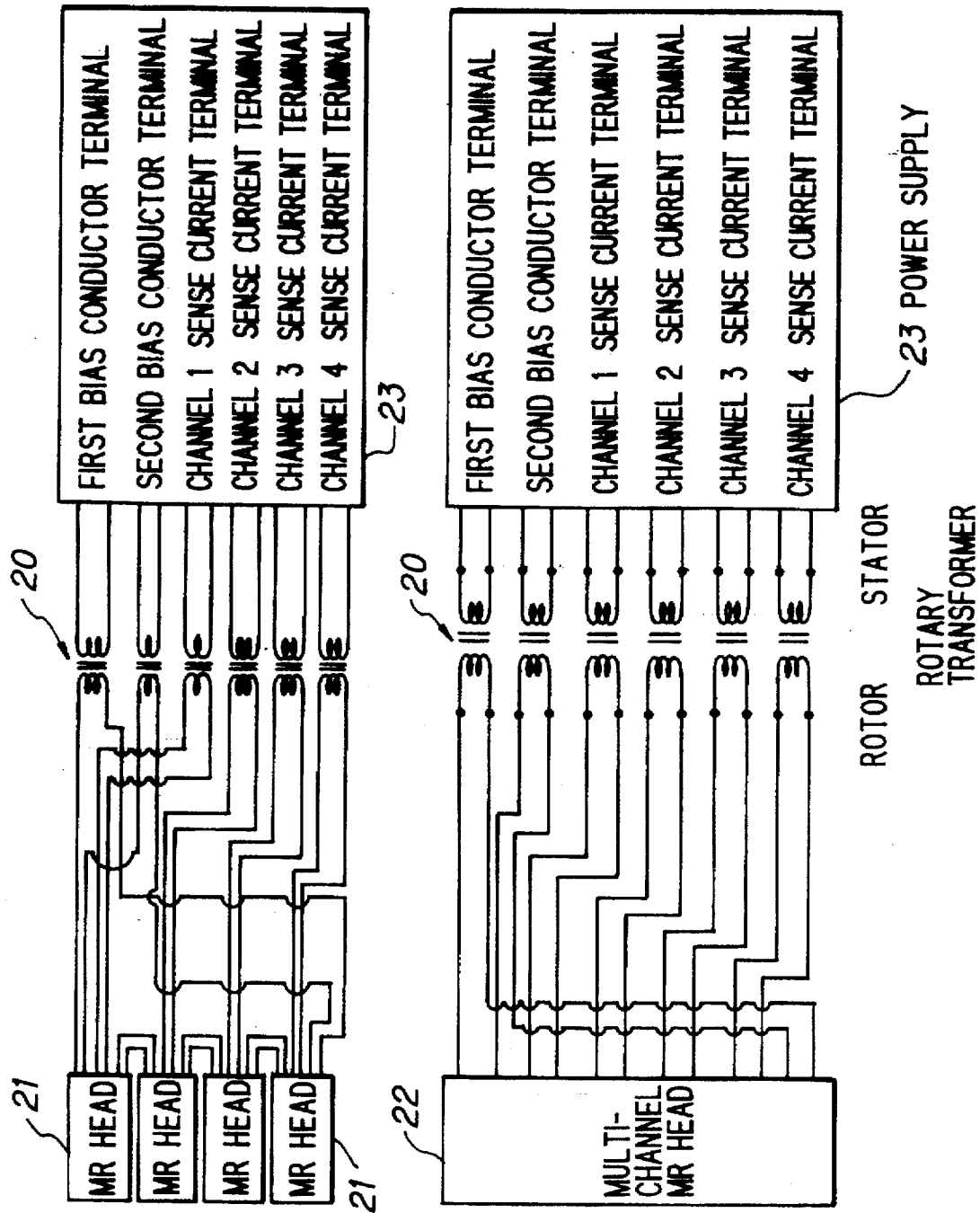
FIGS. 5(A) and 5(B) are connection diagrams of a rotary transformer of the first embodiment of the present invention.

FIG. 5(A) is a connection diagram for a 4-channel MR head configured by loading four single-channel MR heads on a rotary drum. FIG. 5(B) is a connection diagram showing connection between a multi-channel MR head 22 configured by integrating four MR heads and the rotary transformer 20. Reference numeral 23 designates a power supply which has first and second bias conductor terminals and sense current terminals for channels 1 through 4 to serve as a rotary transformer having six channels.

A second embodiment of the present invention will now be described. In this embodiment, the bias currents applied to the first bias conductor $5a$ and second bias conductor $5b$ have the same waveforms as in the first embodiment (FIGS. 9(A) through 9(F)), and a stable direct current is supplied as a sense current. The present embodiment will be described with reference to the waveform diagrams shown in FIGS. 10(A) through 10(G).

FIG. 10(A) shows a sense current $i_S(\theta)$ supplied to the MR film 7. If the sense current is a constant (direct current) expressed by $i_S(\theta)=a/5$, a current $I(\theta)$ which is to be supplied to the stator side of the rotary transformer is a triangular wave which is expressed by an integrated form of the sense current, i.e., $\int i_S(\theta)d(\theta)=I(\theta)=(a/5)i_S(\theta)+K1$.

If $2n\pi<\theta<2(n+1)\pi$, $K1=-(2/5)a\pi n$ (n is an integer).

Since $I(\theta)=0$ when $\theta=2n\pi$, the point in time at which $\theta$ equals $2n\pi$ is selected in a time zone wherein the MR head is moved away from the tape on the rotating drum to turn the signal off. In this regard, this embodiment is the same as the first embodiment.

The voltage generated across the terminals of the MR film 7 during the reproduction of the pattern of magnetization shown in FIG. 10(C) has the waveform as shown in FIG. 10(F) which is expressed by $V_M'=i_S(\theta)\cdot R_M+V_m(\theta)=(a/5)R_M+V_m(\theta)$ where $R_M$ represents the resistance of the MR film 7 when it senses no magnetization and $V_M(\theta)$ represents a voltage induced at the MR film 7 by magnetization.

Then, the difference between a voltage $V_m=(a/5)R_M$ which is the voltage across the MR film 7 with the sense current $i_S(\theta)=a/5$ applied thereto and the voltage $V'_M=(a/5)R_M+V_m(\theta)$ is detected at the stator side of the rotary transformer and provided as output. This is the same as the first embodiment.

Figure 3A:
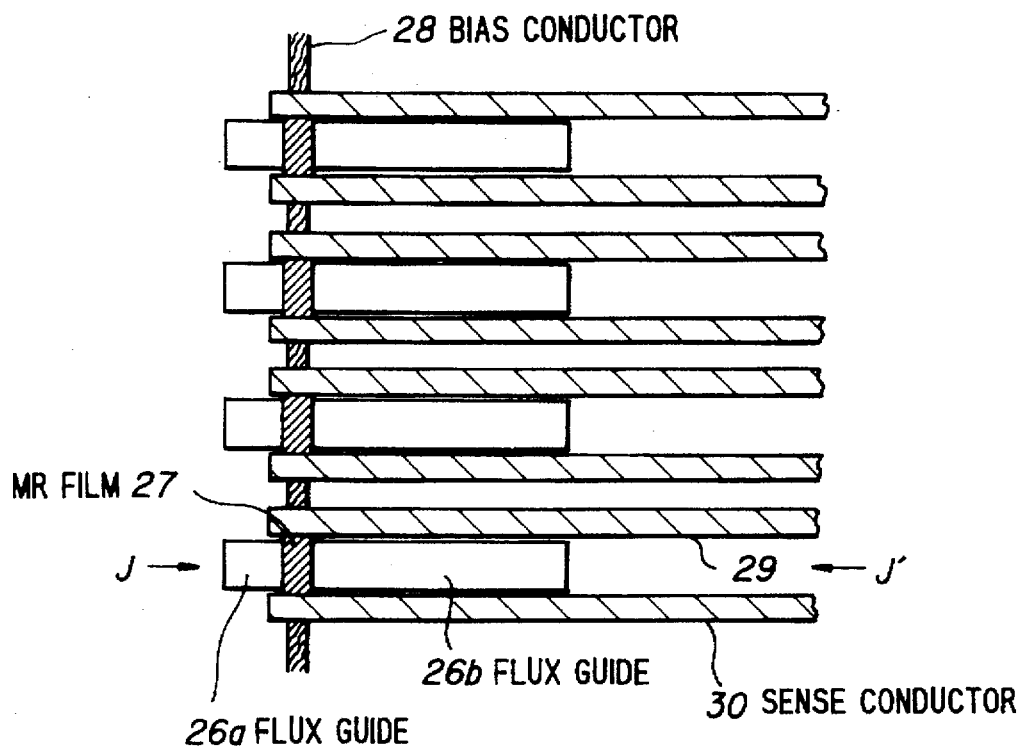
FIGS. 3(A) through 3(C) illustrate a shielded type MR head according to another embodiment of the present invention.
Figure 3B:
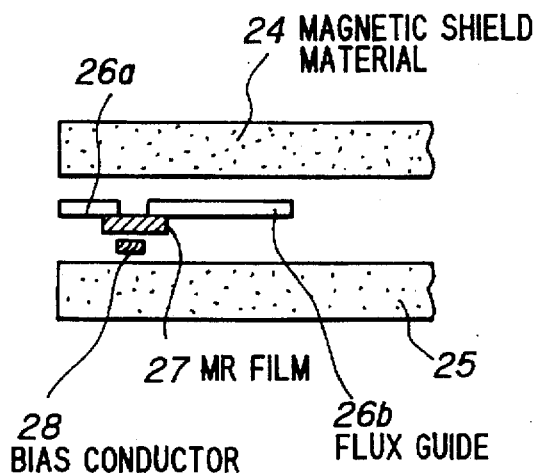
Figure 3C:
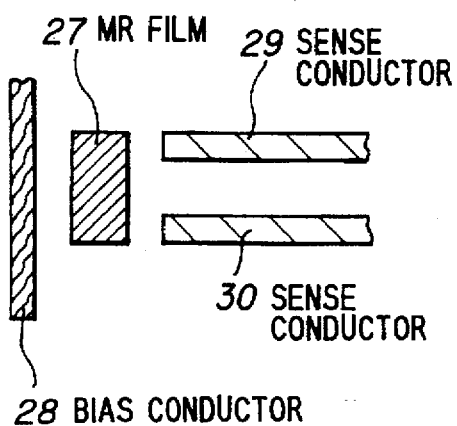

A third embodiment of the present invention will now be described with reference to the shielded type MR head shown in FIGS. 3(A) through 3(C). FIG. 3(A) is a plan view of a major part of this head. FIG. 3(B) is a sectional view taken along the line J–J' in FIG. 3(A). FIG. 3(C) is an exploded view of a major part of this head.

FIGS. 3(A) through 3(C) show a multi-channel shielded type MR head wherein an MR film and a single common bias conductor is provided between two magnetic shield materials.

In FIGS. 3(A) through 3(C), 24 designates a first magnetic shield material; 25 designates a second magnetic shield material; 26a and 26b designate flux guides; 27 designates an MR film, 28 designates a bias conductor; and 29 and 30 designate sense conductors. This configuration itself is not a special configuration, and this is a shielded type MR head having a common configuration in the art. The following description basically applies to both multi-channel MR heads and single-channel MR heads.

In the shielded type MR head shown in FIGS. 3(A) through 3(C), a current having a waveform expressed by $Z(\theta)=(a/\pi)\theta+K$ is applied to the stator side of a rotary transformer connected to the bias conductor 28. If $2n\pi<\theta<2(n+1)\pi$, $K=-2an$ (n is an integer and a and K are constants).

On the other hand, a current having a waveform expressed by $W(\theta)=(a/5)\theta+K$ is applied to the channels at the stator side of the rotary transformer corresponding to the rotor side channels connected to the sense conductors of the MR film 27 of the head for respective channels. If $2n\pi<\theta<2(n+1)\pi$, $K=-(\frac{2}{5})a\pi n$ (n is an integer and a and $K_1$ are constants).

In this embodiment, the MR head is loaded on a rotating drum to reproduce signal output for a VTR with the time at which $\theta=2n\pi$ (n is an integer) again set in a time zone wherein the head is away from the head and no signal output is required. In this embodiment, C/N of 35 dB or more is obtained at 20 MHz.

On the other hand, even if the waveform includes a time zone wherein both the bias and sense currents appear as a direct current at the rotor side as in the prior art, C/N of 10 dB or less is obtained at 20 MHz in response to an output which is not related to the recording signal when the timing of the changes in the waveforms of the currents is in a time zone that overlaps the period during which the signal on the tape is reproduced. Thus, the present embodiment exhibits a significant improvement in C/N.

The method of supplying the bias and sense currents in the present embodiment can be implemented in any MR head having only one bias conductor. Therefore, this method can be applied not only to the shielded type MR head as described above but also to the yoke type MR head as shown in FIGS. 11(A), 11(B), 12, and 13 as it is.

Figure 6A:
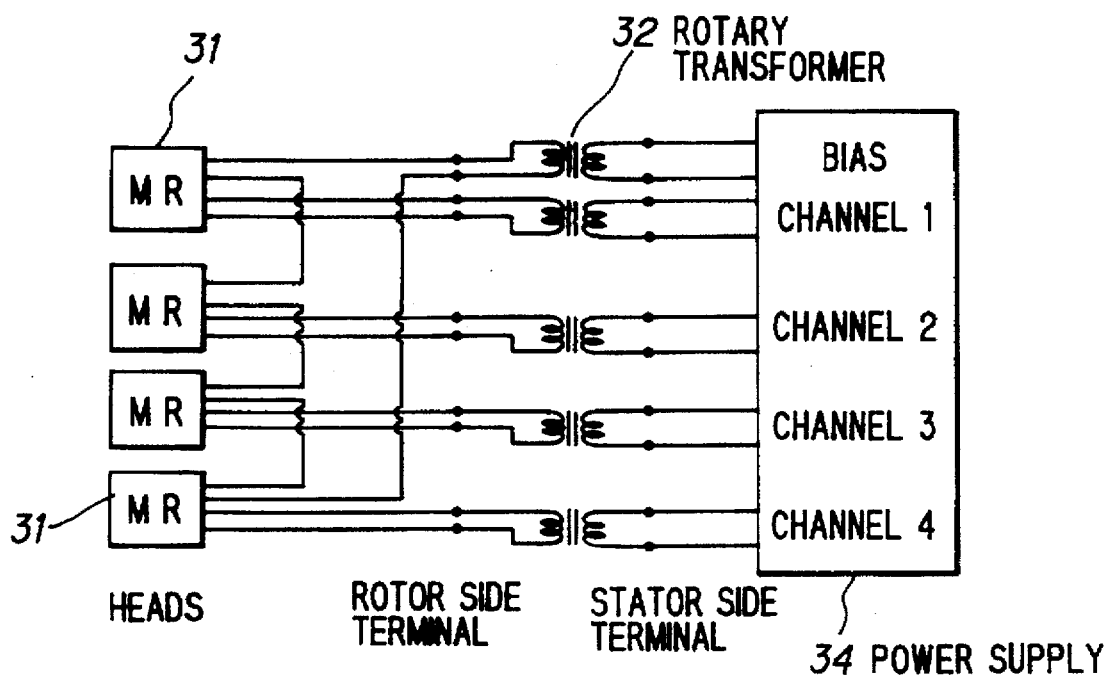
FIGS. 6(A) and 6(B) are connection diagrams of a rotary transformer of another embodiment of the present invention.
Figure 6B:
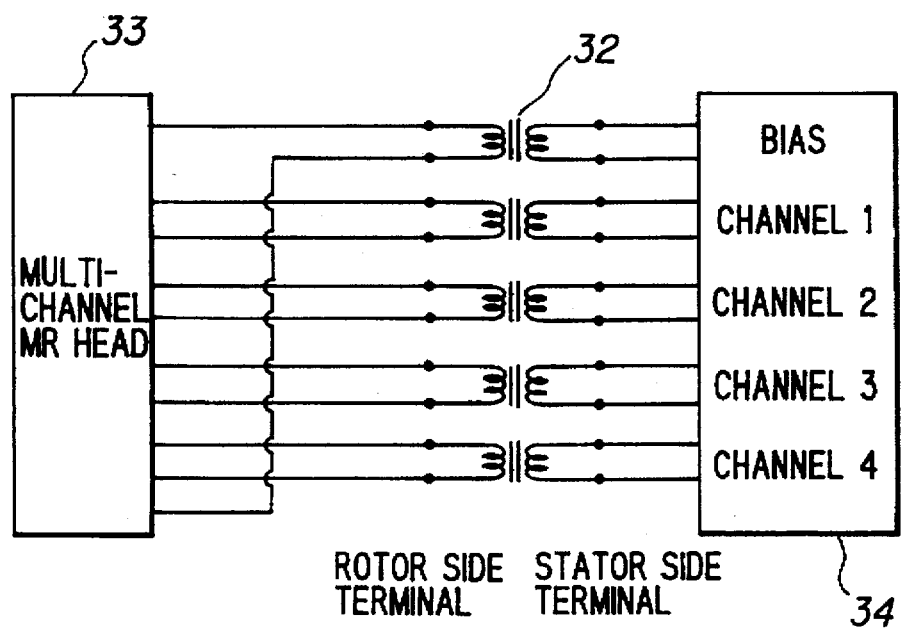

FIG. 6(A) is a connection diagram showing connection between four single-channel MR heads loaded on a rotating drum and a rotary transformer 32. FIG. 6(B) is a connection diagram showing connection between a multi-channel MR head 33 configured by integrating four MR heads loaded on a rotating drum and the rotary transformer 32. A power supply 34 has one bias current supply terminal and sense terminals for four channels which are independent from each other, thereby forming a rotary transformer having five channels.

As alternative embodiments, the present invention can be advantageously applied to magneto-resistance effect type heads including soft film bias magneto-resistance type heads, barber's pole type magneto-resistance effect type heads, and shunt-biased magneto-resistance type heads wherein only a conductor for supplying the sense current is provided with no independent bias conductor and wherein a bias magnetic field is applied to the MR film by a conductor shunted in the vicinity of the MR film or by a soft magnetic film or highly magnetic film provided in the vicinity of the MR film.

Figure 4:
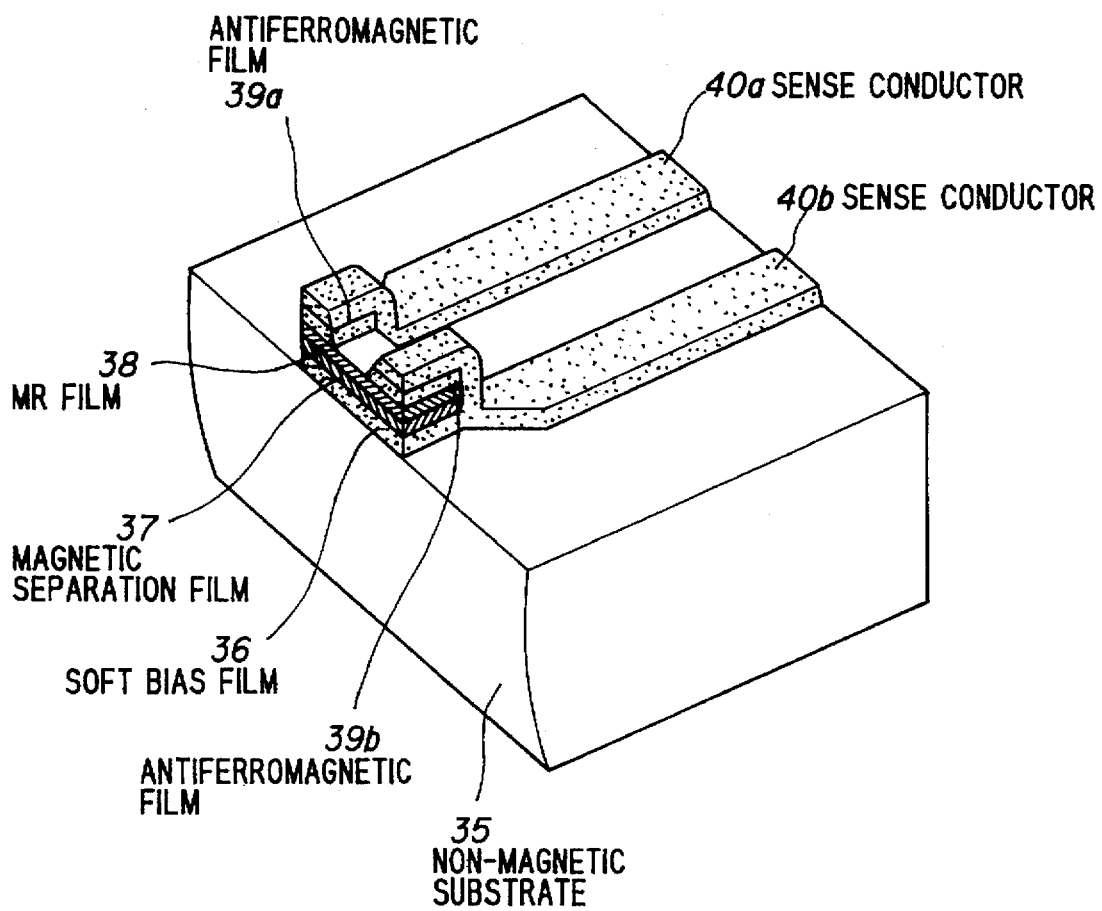
FIG. 4 illustrates a soft film bias magneto-resistance effect type head according to another embodiment of the present invention.

FIG. 4 shows an example of a soft film bias magneto-resistance effect type head. In FIG. 4, 35 designates a non-magnetic substrate having a 3-layer structure obtained by sequentially laminating a soft bias film 36 made of a CoZrMo alloy, a non-magnetic magnetic separation film 37 made of Ta (tantalum) or the like, and an MR film 38 made of FeNi or the like on the non-magnetic substrate.

A pair of antiferromagnetic films 39a and 39b made of FeMn are laminated on both sides of the MR film 38. Sense conductors 40a and 40b are provided on the antiferromagnetic films 39a and 39b and a side of the 3-layer structure as described above to serve as leaders on the non-magnetic substrate 35.

In the soft film bias magneto-resistance effect type head having the above-described configuration, when currents flow through the sense conductors 40a and 40b on the MR film 38, a magnetic field is generated around the MR film 38 to cause a change in the direction of the magnetization of the soft bias film 36. Magnetic flux emanating from the soft bias film 36 acts on the MR film 38 as a bias magnetic field.

A head having such a configuration does not have a bias conductor which is independent from the sense conductor as described above. Therefore, it needs only rotary transformer channels through which the sense current is supplied and does not need channels for biasing as shown in FIGS. 5(A), 5(B), 6(A), and 6(B).

When the present invention is applied to such a head, the supply of the DC sense current to the sense current conductor terminals through the rotary transformer is carried out on the same principle as in the second embodiment.

As described above, the present invention provides the advantages as described below.

(1) An MR head having high output can be obtained as a reproduction head for a rotating drum type VTR by only providing a conventional rotary transformer with a rotor and a stator for supplying a bias current without a need for a special mechanism for transmitting a direct current.

(2) There is provided an MR head having C/N of 35 dB or more which is loaded on a rotating drum as a multi-channel MR head.

(3) When the present invention is applied to an inductive head, a rotating head can be fabricated with a head that provides multiple channels in a quantity which has been more unachievable for higher track densities.

(4) An MR head according to the present invention makes it possible to provide an inexpensive VTR having a high transfer density.

While specific illustrated embodiments have been shown and described, it will be appreciated by those skilled in the art that various modifications, changes and additions can be made to the invention without departing from the spirit and scope thereof as set forth in the following claims.

What is claimed is:

1. A magneto-resistance effect type magnetic head device mounted on a rotating drum, for sensing magnetic signals from a magnetic recording medium moving past said rotating drum, the device having a magneto-resistive element, a bias conductor magnetically coupled to said magneto-resistive element, and a sense conductor electrically connected to said magneto-resistive element, comprising:

a rotary transformer having a first rotor channel connected to rotate with said drum and electrically connected to said bias conductor, and a second rotor channel connected to rotate with said drum and electrically connected to said sense conductor;

a stationery stator having a first stator channel magnetically coupled to said first rotor channel, and a second stator channel magnetically coupled to said second rotor channel;

a power supply for applying an alternating current having a frequently lower than the frequency of a recording signal to at least one of said first and second stator channels, said second stator channel producing a waveform from said sense conductor responsive to a variable external magnetic field produced by said magnetic recording medium moving past said magneto-resistive element; and a further magneto-resistive element, a further bias conductor magnetically coupled to said further magneto-resistive element, and a further sense conductor electrically connected to said further magneto-resistive element and said transformer having a further rotor channel connected to rotate with said drum, and electrically connected to said further sense conductor, and a further stator channel magnetically coupled to said further rotor channel, said further stator channel producing a further waveform from said further sense conductor;

wherein, said magneto-resistive element rotates with said rotating drum to pass across said magnetic recording medium during a first time period and separates from said magnetic recording medium during a second time period for each revolution of said rotating drum, and said alternating current is selected to produce a non-direct current at one of said first and second rotor channels during said second period and to produce a direct current during said first time period, said bias conductor is constituted by two independent bias conductors and said power supply applies two alternating currents to the two bias conductors such that the sum thereof approximates a direct current for effecting a linearized DC bias field as seen by the magneto-resistive element.

* * * * *